(12) United States Patent
Johnson et al.

(10) Patent No.: US 7,112,891 B2
(45) Date of Patent: Sep. 26, 2006

(54) MOBILE-POWER SYSTEM WITH SOLAR-POWERED HYDROGEN LIBERATOR, FUEL CELL, TURBINE, AND CAPACITORS

(75) Inventors: Larry L. Johnson, Overland Park, KS (US); Julie A. Willets, Overland Park, KS (US); Jerry D. Meyers, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 11/123,548

(22) Filed: May 5, 2005

(65) Prior Publication Data

US 2006/0066105 A1  Mar. 30, 2006

Related U.S. Application Data

(63) Continuation-in-part of application No. 10/439,204, filed on May 15, 2003, now Pat. No. 6,930,402.

(51) Int. Cl.
F02B 63/04 (2006.01)
(52) U.S. Cl. ............ 290/1 A; 290/1 C; 290/1 R; 290/52; 290/13; 180/656.3
(58) Field of Classification Search ........... 290/1 A, 290/1 C, 1 R, 52, 13; 180/65.3
See application file for complete search history.

(56) References Cited

U.S. PATENT DOCUMENTS

| | | | |
|---|---|---|---|
| 3,101,307 A | 8/1963 | Barr et al. | |
| 3,732,690 A | 5/1973 | Meijer | |
| 3,771,926 A * | 11/1973 | Pardieck | 415/176 |
| 3,813,557 A * | 5/1974 | Traeger | 290/2 |
| 4,119,861 A | 10/1978 | Gocho | |
| 4,119,881 A * | 10/1978 | Calderon | 313/360.1 |
| 4,199,037 A * | 4/1980 | White | 180/65.4 |
| 4,211,930 A * | 7/1980 | Fengler | 290/15 |
| 4,283,634 A | 8/1981 | Yannone et al. | |
| 4,598,542 A | 7/1986 | Reynolds | |
| 4,736,111 A | 4/1988 | Linden | |
| 5,136,173 A * | 8/1992 | Rynne | 290/53 |
| 5,737,202 A | 4/1998 | Shimamori | |
| 5,760,488 A | 6/1998 | Sonntag | |
| 5,765,656 A * | 6/1998 | Weaver | 180/65.3 |
| 5,767,584 A | 6/1998 | Gore et al. | |
| 5,767,637 A | 6/1998 | Lansberry | |
| 5,929,538 A | 7/1999 | O'Sullivan et al. | |
| 5,959,851 A | 9/1999 | Shutts | |
| 6,011,324 A | 1/2000 | Kohlstruck et al. | |
| 6,184,593 B1 | 2/2001 | Jungreis | |
| 6,304,006 B1 | 10/2001 | Jungreis | |
| 6,380,637 B1 | 4/2002 | Hsu et al. | |

(Continued)

FOREIGN PATENT DOCUMENTS

EP   0 595 191 A   5/1994

(Continued)

OTHER PUBLICATIONS

"A High-Availability Backup Source of Energy", J.C. Chigolet et al. Sep. 27, 1993.

(Continued)

*Primary Examiner*—Darren Schuberg
*Assistant Examiner*—Iraj A. Mohandesi

(57) ABSTRACT

The present invention is a mobile-energy generating system. It comprises a turbine, a fuel cell, commercial electrical power hookups, capacitors used for bridging purposes, and hydrogen-storage tanks. Pressurized hydrogen is maintained in the tanks using a hydrogen liberator which is optionally powered by a solar panel.

10 Claims, 4 Drawing Sheets

U.S. PATENT DOCUMENTS

| | | |
|---|---|---|
| 6,452,289 B1 | 9/2002 | Lansberry et al. |
| 6,463,738 B1 | 10/2002 | Pinkerton et al. |
| 6,492,047 B1 | 12/2002 | Peled et al. |
| 6,498,462 B1 | 12/2002 | Ballantine et al. |
| 6,516,616 B1 | 2/2003 | Carver et al. |
| 6,522,955 B1 | 2/2003 | Colborn |
| 6,649,289 B1 | 11/2003 | Hsu et al. |
| 6,666,123 B1 | 12/2003 | Adams et al. |
| 6,670,721 B1 | 12/2003 | Lof et al. |
| 6,700,214 B1 | 3/2004 | Ulinski et al. |
| 6,703,722 B1 | 3/2004 | Christensen |
| 6,746,790 B1 | 6/2004 | Colborn |
| 6,833,631 B1 | 12/2004 | Van Breems |
| 6,841,893 B1 | 1/2005 | Maiwald et al. |
| 6,879,052 B1 | 4/2005 | Johnson |
| 6,885,112 B1 | 4/2005 | Johnson |
| 6,907,735 B1 | 4/2005 | Johnson |
| 6,930,402 B1 | 8/2005 | Johnson |
| 6,960,838 B1 | 11/2005 | Johnson |
| 6,992,401 B1 | 1/2006 | Johnson |
| 2001/0009338 A1 | 7/2001 | Reutere |
| 2004/0094963 A1 | 5/2004 | Johnson |
| 2004/0095022 A1 | 5/2004 | Johnson |
| 2006/0016189 A1 | 1/2006 | Johnson |
| 2006/0038403 A1 | 2/2006 | Johnson |
| 2006/0038533 A1 | 2/2006 | Johnson |
| 2006/0049637 A1 | 3/2006 | Johnson |
| 2006/0066108 A1 | 3/2006 | Willets |
| 2006/0071476 A1 | 4/2006 | Johnson |
| 2006/0076780 A1 | 4/2006 | Johnson |
| 2006/0076831 A1 | 4/2006 | Meyers |

FOREIGN PATENT DOCUMENTS

| | | |
|---|---|---|
| EP | 0 718 094 A | 6/1996 |
| WO | 99/32762 | 7/1999 |
| WO | 2002087742 A1 | 11/2002 |
| WO | 2004/047206 A2 | 6/2004 |
| WO | 2004047250 A2 | 6/2004 |
| WO | 2004047262 | 6/2004 |
| WO | 2004/105212 | 12/2004 |

OTHER PUBLICATIONS

Noboru Asano, "The Future of Our Fuel Cell Total Energy System," NTT Review, Mar. 1994, vol. 6, pp. 47-53.

Yutaka, Kuwata, "Multifueld Fuel-Cell Energy System for Telecommunications Cogeneration System," Iece Trans Commun., vol. E1 B., No. 11, Nov. 1998.

U.S. Appl. No. 10/648,973, filed Aug. 27, 2003, Johnson.
U.S. Appl. No. 11/120,053, filed May 2, 2005, Willets.
U.S. Appl. No. 11/132,013, filed May 18, 2005, Johnson.
U.S. Appl. No. 11/140,761, filed May 31, 2005, Meyers.
U.S. Appl. No. 11/153,806, filed Jun. 15, 2005, Willets.
U.S. Appl. No. 11/225,987, filed Sep. 14, 2005, Willets.
U.S. Appl. No. 11/225,988, filed Sep. 14, 2005, Meyers.
U.S. Appl. No. 11/326,257, filed Jan. 5, 2006, Meyers.

Szary, Patrick J. and Dr. Ali Maher, "PEM Fuel Cell Integration With a Hydrogen Generator on a Bench," Final Report Jun. 2001, FHWA-NJ-2001-03, New Jersey Department of Transportation.

* cited by examiner

MOBILE-POWER SYSTEM WITH SOLAR-POWERED HYDROGEN LIBERATOR, FUEL CELL, TURBINE, AND CAPACITORS

CROSS-REFERENCE TO RELATED APPLICATIONS

This application is a continuation-in-part of and claims priority pursuant to 35 U.S.C. Section 120 from U.S. application Ser. No. 10/439,204 filed May 15, 2003 now U.S. Pat. No. 6,930,402.

STATEMENT REGARDING FEDERALLY SPONSORED RESEARCH OR DEVELOPMENT

None.

FIELD OF THE INVENTION

In general, this invention is a mobile-power supply system. More specifically, this invention relates to the field of providing backup DC power to a facility. Additionally, the invention relates to using solar energy to drive a hydrogen-liberation unit so that hydrogen may be stored and then consumed by a fuel cell to provide DC backup.

BACKGROUND OF THE INVENTION

Traditionally, commercial power from a utility has been used as the primary source of electrical power for a consuming entity, e.g., a telecommunications facility. Many power systems include backup power sources to deliver power in the event the utility is unable to deliver power. Black-outs and other disturbances in the commercial power grid make this necessary. To accomplish this, many facilities use a diesel generator. The diesel generator is then backed up by an array of batteries.

Conventionally, all of these systems—the commercial AC receiving equipment, the diesel generator, and the batteries—are all physically installed around or in the facility. The installation process drains engineering time because it typically involves customizing the equipment to meet the needs of the facility.

Operationally, if power from the commercial utility is lost, the diesel generator is activated to supply power to the facility. It takes time for the diesel generator to come online, though. Because of this, the battery array provides power during the time it takes to switch from the utility source to the diesel-generated source. If the generator also fails (e.g., runs out of fuel), then the battery array is able to provide power for an additional (but limited) period of time.

SUMMARY OF THE INVENTION

The present invention encompasses a power system which overcomes faults present in conventional arrangements. The system includes a microturbine fueled by natural gas from a commercial gas-utility company or from one or more standby natural gas tanks. The microturbine is used as the primary power source for the facility. In the event of natural gas supply problems, or microturbine failure, the system draws power from an AC utility. In the event of failure of the AC power grid, a hydrogen-powered fuel cell delivers backup power.

A hydrogen-liberation device is used to derive hydrogen from a source of water. This device is primarily solar powered. When solar power is not available, the hydrogen liberator runs off the AC turbine output or draws AC from the utility. Hydrogen produced by the liberator is stored in tanks for future use by the fuel cell.

In the event there is a sudden temporary drop in power, e.g., when a switch is made between power-generating sources, an array of super capacitors will be used to bridge the downtime until one of the power generators is brought online.

BRIEF DESCRIPTION OF THE DRAWINGS

The present invention is described in detail below with reference to the attached drawing figures, wherein.

DETAILED DESCRIPTION OF THE INVENTION

The present invention is entirely mobile. This makes is ideal for serving power consumers in remote locations. It also uses turbine-combusted natural gas as its primary source of energy. This eliminates dependence on utility-purchased AC. Utility AC is only used if the turbine fails (e.g., natural gas is unavailable or some mechanical malfunction). If commercial AC is not available, the system uses a fuel cell to generate DC power. The fuel cell runs on hydrogen.

The hydrogen used to run the fuel cell is stored in tanks. The supply in these tanks is maintained by a hydrogen-liberation device. This device derives hydrogen from water. The source of water may be tap water from a hose.

AC power is required to run the liberator. This power can be supplied in a number of ways. Primarily the power to the liberator is provided by photovoltaic panels. Alternatively, power to the liberator is derived from the turbine AC output or from the utility-AC source.

Figure 1:
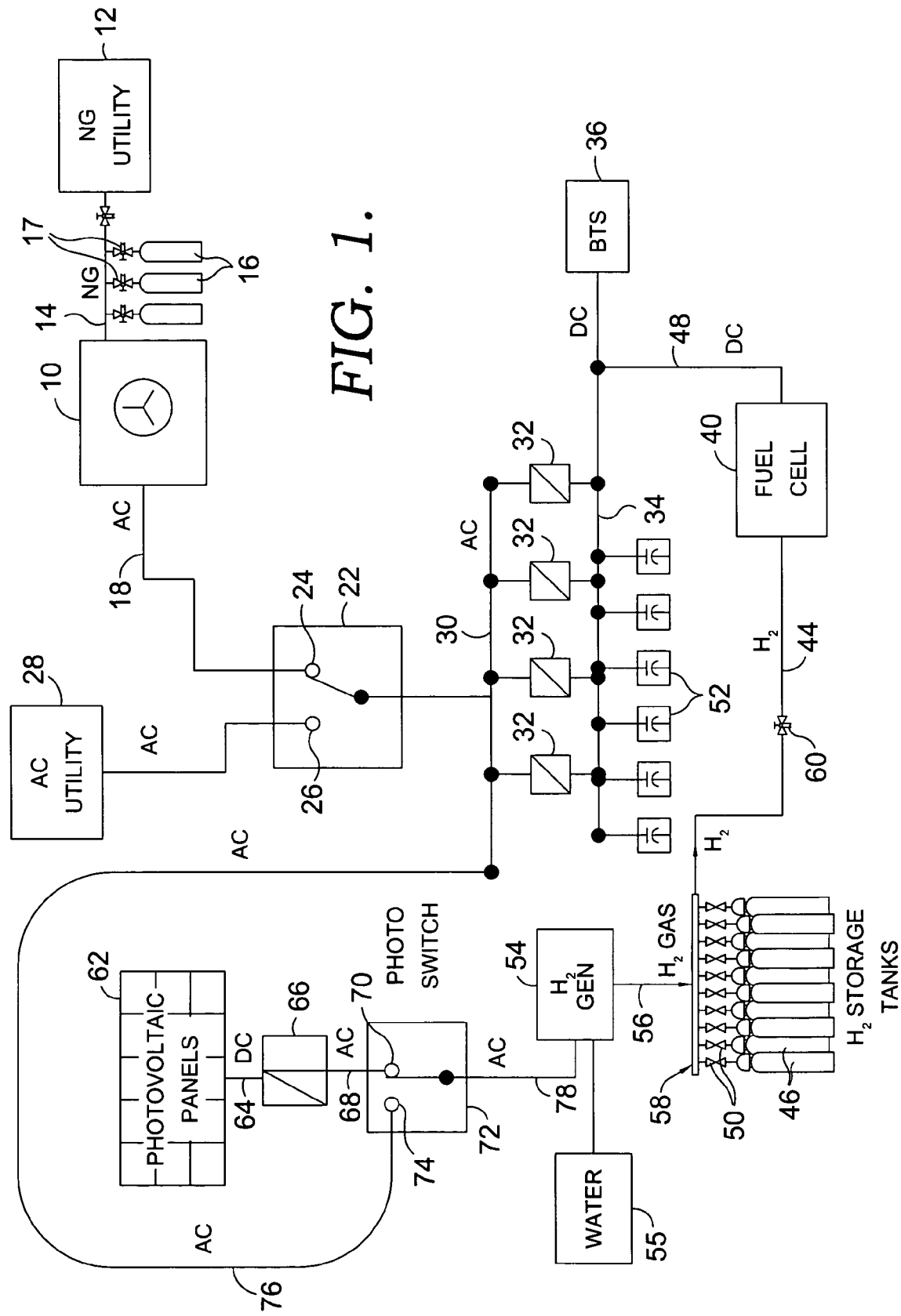
FIG. 1 is a schematic diagram showing one embodiment of the system of the present invention.
Figure 2:
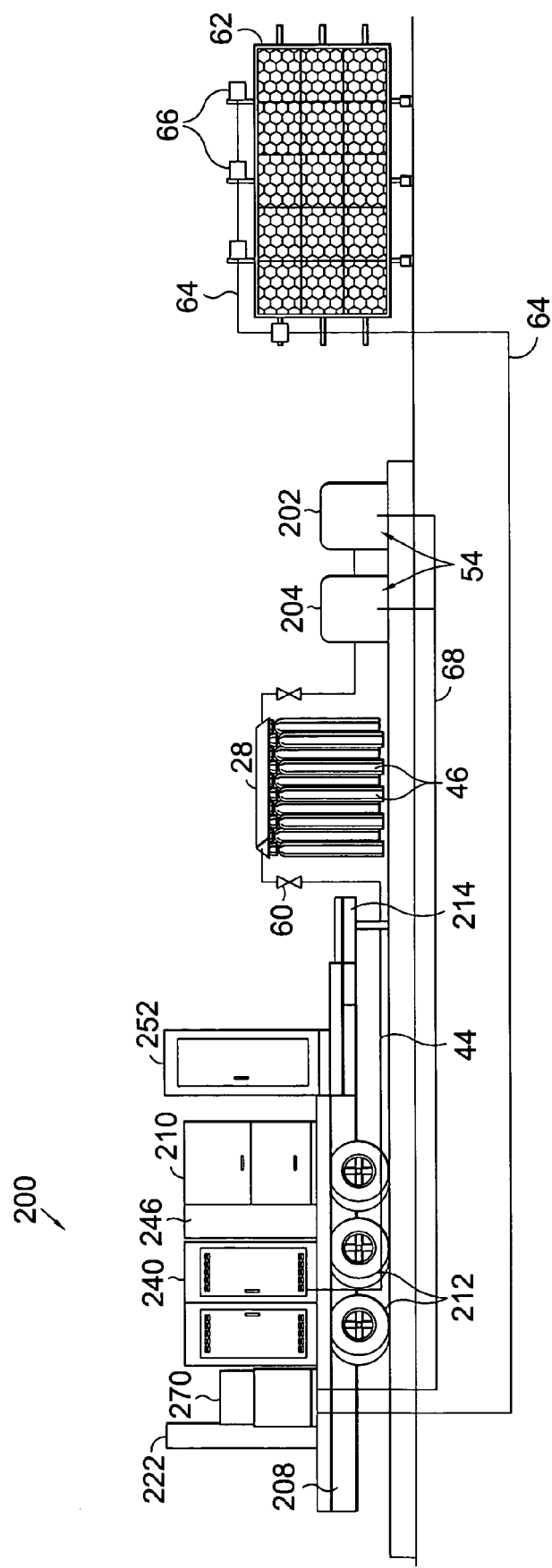
FIG. 2 depicts the mobility aspects of the devices of the present invention showing the trailer and other associated components.
Figure 3:
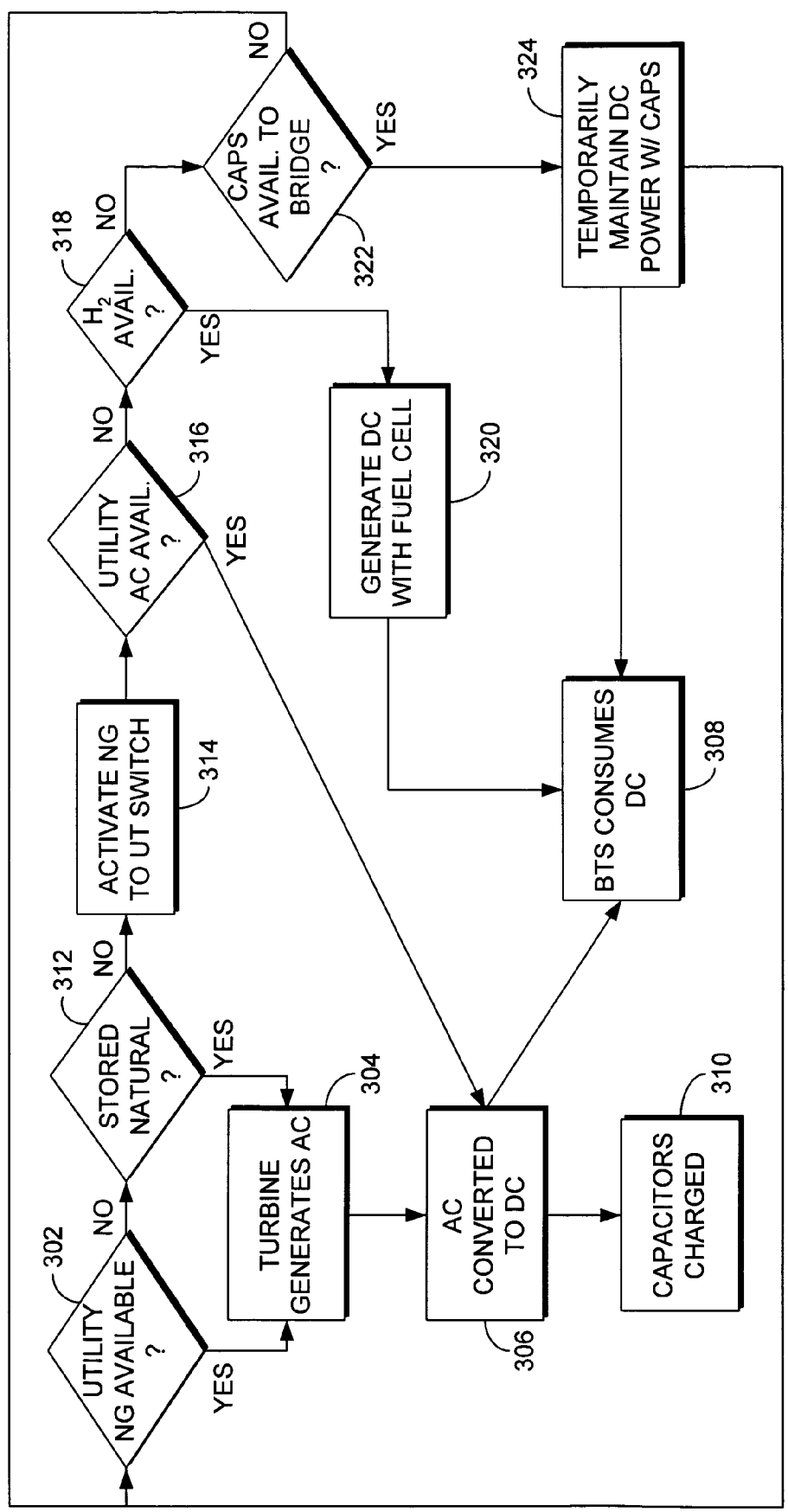
FIG. 3 is a flow diagram showing the backup-power-management system of the present invention.
Figure 4:
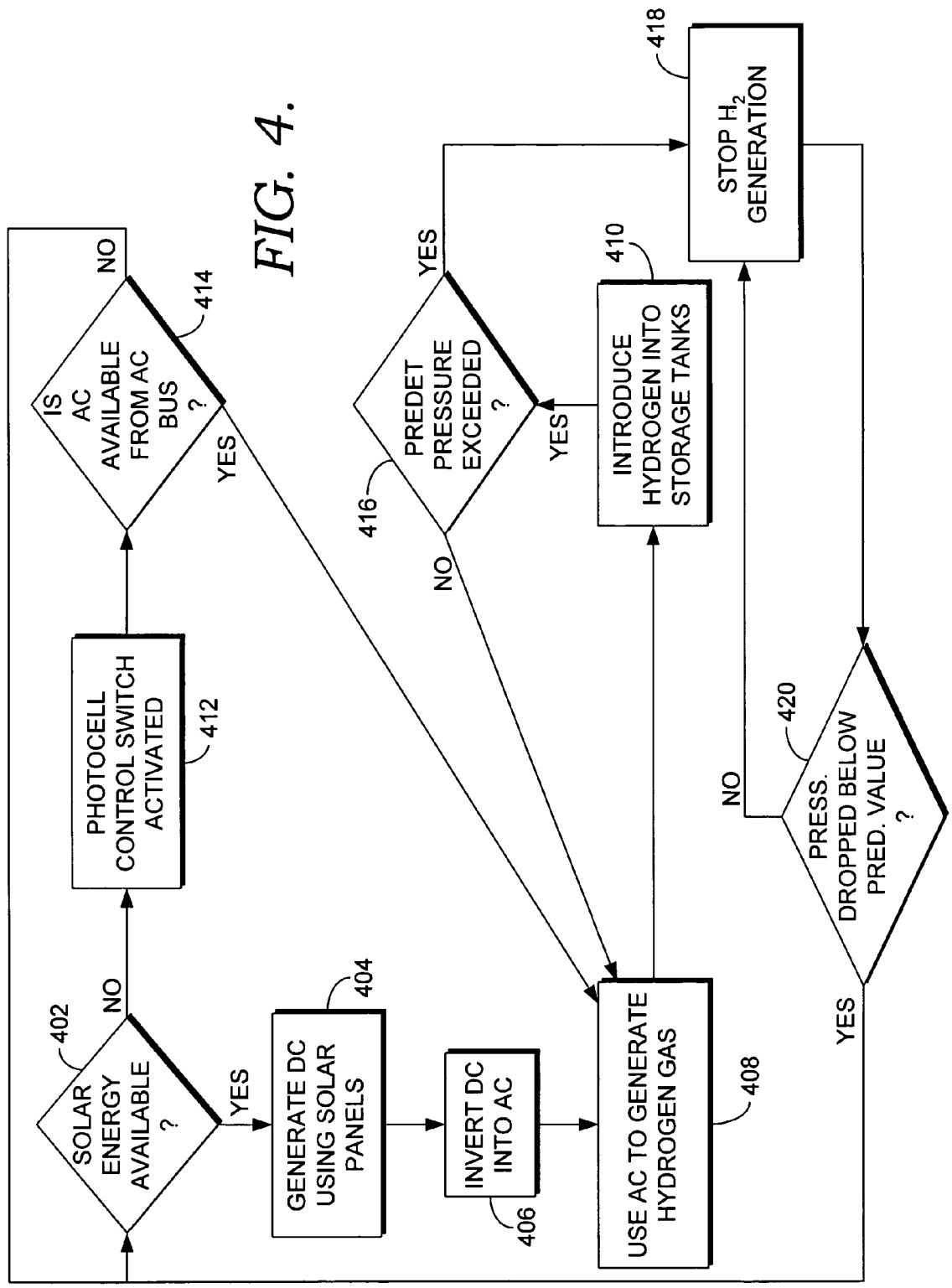
FIG. 4 is a flow diagram showing the hydrogen-generating processes of the present invention.

The present invention is best understood in connection with (i) the schematic diagram of FIG. 1, (ii) the drawing of the physical embodiments in FIG. 2, and (iii) the flow charts of FIGS. 3 and 4.

Referring first to FIG. 1, the schematic shows one embodiment for a novel power system. The system includes a turbine generator 10. In the preferred embodiment, the turbine is driven by the combustion of a fuel. The rotational energy created by combustion is used to drive a generator. This generator utilizes the rotation of the engine to produce electrical power.

In the preferred embodiment, turbine generator 10 is a micro-turbine generator. One micro-turbine generator proven suitable for incorporation into the present invention is the Capstone 60 Micro-Turbine™ system produced by the Capstone Turbine Corporation of Chatsworth, Calif. These kinds of micro-turbines operate in substantially the same way as do other turbines but are smaller. This makes them ideal in accomplishing the mobile-platform objectives of the present invention. They are designed to use natural gas, propane, or some other fuel source to produce electrical power. Though any of these fuels could be used, natural gas is the fuel type in the preferred embodiment. Other fuels could be used instead, however, and still fall within the scope of the present invention.

Unlike other kinds of internal-combustion engines, e.g., diesel generators, micro-turbines emit fewer harmful gases. Further, because micro-turbines like turbine 10 are compact, they are ideal for situations in which space is limited, and they are more easily adapted for inclusion on a trailer, or other portable means.

The natural gas used to power turbine 10 is obtained primarily from a commercial utility 12. To do so, natural gas is received in a line 14 which is used to introduce natural gas into turbine 10. As one skilled in the art will recognize, natural gas from commercial pipelines needs to be pressurized. Pressurization is necessary because pipelines normally run at low pressures (relatively speaking), whereas micro-turbines require higher pressures. To accomplish this objective, the natural gas received from utility 12 is introduced into an expansion tank (not shown) to build up pressures before being introduced into turbine 10 so that it may be properly combusted.

Utility 12 is not the only possible fuel source for turbine 10. In case there is a temporary shortage or complete failure of the line-supplied natural gas source, the system provides a stored source of natural gas. It is stored in a plurality of natural-gas storage tanks 16. Tanks 16 will supply natural gas to turbine 10 in case natural gas is not available from commercial utility 12.

Regardless of how natural gas is supplied, its combustion in turbine 10 will produce a primary source of energy for the facility—initially in the form of an AC output 18 of electrical power. The AC output 18 is protected by a circuit breaker which is included with turbine 10. This protects the system from power surges and other like maladies.

AC output 18 is coupled to one side of a switch 22. Switch 22 in the figure is shown in a first position 24 in which it is connected to the AC output 18 of turbine 10. The switch also has a second position 26 which will disconnect it from the turbine output 18 and connect it to a local utility source of AC 28.

Regardless of whether switch 22 is in first position 24 (as is reflected in the figure) or in second position 26, the AC is received into an AC bus 30. Bus 30 couples the switch output to a plurality of conversion devices 32. In the preferred embodiment, conversion devices 32 are rectifiers. As is known, a rectifier is capable of receiving an AC input and converting that input to produce a DC output. Thus, rectifiers 32 convert the micro-turbine-produced or utility-received AC power to DC power. The output of each rectifier is coupled into DC bus 34. Bus 34 is connected into the power distribution unit (PDU) (not shown) for a base transceiver station (BTS) 36. PDUs comprise the electrical equipment for making the necessary connections into the telecommunication-cell-site equipment. In the present embodiment, this equipment is housed in cabinets.

Again, in its primary mode of operation, the BTS 36 is powered by turbine 10 using natural gas from utility 12. When this is so, switch 22 will be in first position 24 as shown in the FIGS. In the case that natural-gas-utility-source 12 fails, valves 17 on natural-gas-storage tanks 16 will open up, and the turbine will be begin consuming the stored gas.

In the event both natural gas sources 12 and 16 fail, switch 22 moves from position 24 to position 26 (contrary to the position shown in the figure.). This causes AC to be supplied from utility 28 and is received into bus 30. So long as switch 22 remains in position 26, the system operates on the externally received AC from utility 28. This will continue until natural gas is somehow restored and turbine 10 returned to service.

In the event the AC power grid fails, and natural gas is still unavailable, there is another option. The system also includes a fuel cell 40. Fuel cells are electrochemical-energy-conversion devices. They utilize hydrogen and oxygen. Proton exchange membranes (or other equivalent devices) in the fuel cell cause the electron from hydrogen to be removed temporarily. Later, this hydrogen electron is returned when the hydrogen is combined with the oxygen to produce water. This creates electricity. The reaction is entirely noncombustive and generates DC electrical power. Because the only by-products of this reaction are heat, water, and electricity, a fuel cell is friendly to the environment. In addition, a fuel cell is capable of providing electrical power for as long as hydrogen fuel is supplied to the unit. It does not discharge over time like a battery.

In the preferred embodiment disclosed in FIG. 1, fuel cell 40 includes a plurality of proton-exchange-membranes (PEMs) which are not shown in the figures. Hydrogen fuel is delivered to fuel cell 40 via a hydrogen conduit 44. Hydrogen tubing 44 is shown in the FIG. 1 as being supplied by a plurality of pressurized hydrogen tanks 46.

Though fuel cell 40 used in the preferred embodiment has been shown and described herein as using PEMs, other fuel-cell technologies exist which might be used instead and still fall within the scope of the present invention. One example of a PEM-type fuel cell which is suitable for use with the present invention is the modular, cartridge-based, proton exchange membrane I-1000 power module manufactured by Reli-On, Inc. of Spokane, Wash.

The rate of hydrogen flow into line 44 may be controlled using automated valves 50 which control each of the tanks 46. These valves will enable the hydrogen produced to be stored and then released when needed.

If the stored hydrogen is released, it will be introduced to fuel cell 40 via line 44. Once it reaches fuel cell 40, a DC power output 48 is produced. Output 48 feeds into DC bus 34 which makes the fuel-cell-produced power available to BTS 36.

The FIG. 1 embodiment also includes a plurality of capacitors 52. These devices are electrically connected into bus 34 and are used primarily for bridging purposes between power sources. By employing these components, the system avoids the need for an array of batteries. This makes it more cost-efficient and easier to maintain than the conventional methods.

So long as there is an active source of power, e.g., if one of turbine 10, AC utility 28, or the fuel cell 40 is operational, DC electricity will be supplied to bus 34. This DC electricity acts to maintain a charge in capacitors 52. This enables them to serve as a bridge between power source transitions (turbine 10, AC utility 28, and fuel cell 40).

Each capacitor in the plurality 52 is electrically linked into bus 34 along with fuel cell DC output 48 and the rectifier outputs. As seen in the FIG., all of these DC sources are connected into bus 34. Bus 34 then makes the electrical connection into the power-distribution equipment in BTS 36.

While one of the power output devices (turbine 10, AC utility 28, and fuel cell 40) is transitioning to another, the already charged capacitors will drain to maintain power until one of the other output devices comes online. As a practical matter, this kind of power drop will most likely occur when a switch is made from one power source to another. For example, when turbine 10 goes down and switch 22 goes from position 24 to position 26, there will be about a 400 millisecond delay in which no AC is being supplied. Another situation in which there will be a temporary power drop is if both turbine 10 and AC utility 28 are down. This is because it takes about 14 seconds to 2 minutes (depending on which vendor's fuel cell is utilized) for the fuel cell to come online to the point that it is generating DC power. The plurality of capacitors 52 are capable of handling the down time which occurs with either of these situations. Thus, switching between power sources (e.g., going from natural gas to electric utility or from utility to hydrogen) are bridged by the capacitors.

Though not shown, the power system of the present invention also comprises a control system which includes a number of sensing and control mechanisms (not shown) for determining which fuel source to activate and which power source to engage. As will be known to one skilled in the art, these kinds of automated systems may be separate devices or may be integral to the valves, bus lines, and/or devices being monitored. Likewise, the control mechanisms may be separate devices, such as programmable logic controllers, or may be integrated into the components already described. One skilled in the art will know how to arrange these devices such that (i) natural gas can be selectively delivered from one of sources 12 and 16; (ii) turbine 10 can be activated and deactivated automatically; (iii) valves 50 can be opened and closed to supply fuel cell 40; (iv) switch 22 changed between positions 24 and 26 in response to the availability of natural gas to turbine 10; and other automated requirements which will be evident and fall within the abilities of one skilled in the art.

The system of the present invention also includes a unique system for generating the hydrogen gas which is stored in tanks 46. This is done using a hydrogen liberator. As will be known to one skilled in the art, a hydrogen liberator uses electricity to convert water into hydrogen and oxygen.

Though not shown in FIG. 1, FIG. 2 discloses that hydrogen liberator 54 includes two portions—an electrolysis unit 202 and a compressor 204. The electrolysis unit receives water from a water source (55 in FIG. 1, not shown in FIG. 2) and separates the hydrogen and oxygen. Water source 55 would likely comprise a tap water source which is easily connected into hydrogen liberator 54 using tubing, e.g., a garden hose. The compressor is used to pressurize the hydrogen so that it can be stored and then released under pressure. Referring back to FIG. 1, we see that the hydrogen output from hydrogen liberator 54 will travel through tubing 56 into a header 58. Header 58 functions as a manifold and enables the pressure in each tank to be equalized. The oxygen output is vented to the atmosphere. The hydrogen, after passing into header 58, is introduced into the storage tanks 46 by opening the valves 50. These valves will remain closed unless the pressure within $H_2$ header 58 falls below a predetermined level. Once the pressure falls below this level, hydrogen liberator 54 will be activated (via pressure switches) and the valves 50 opened up to fill the tanks to a predetermined maximum. Once (if) this maximum is reached, pressure switches will then cause hydrogen liberator 54 to be turned off, and then the valves 50 will be closed to maintain the stored hydrogen at the desired pressure.

This stored hydrogen will be consumed by fuel cell 40 if the turbine 10 and AC utility 28 both become inoperable (because of, i.e., a fuel deficiency, blackout, mechanical failure). When fuel cell 40 is activated under these circumstances, the control system will cause valve 60 to open. The consumption of hydrogen by the fuel cell will cause a pressure drop in the header 58 below a minimum value. When the pressure has dropped below the predetermined value, valves 50 will open up to enable the stored hydrogen to be consumed. This pressure drop will also trigger hydrogen liberator 54 into action so that it is producing hydrogen to somewhat offset the losses created by the fuel cell consumption.

Hydrogen liberator 54 is powered by AC. Referring to FIG. 1, we see that hydrogen liberator 54 may receive power in two different ways. First, during periods when solar energy (sunlight) is available power will be derived from a photovoltaic cell module 62. It should be understood that a photovoltaic cell converts light into DC electricity. Therefore, when ample light is available, photovoltaic panel 62 generates a source of DC power 64.

It is important to note, that even though photovoltaic cells are disclosed as being used in the preferred embodiment, that other kinds of environmentally-driven power generation devices could be used instead and still fall within the scope of the present invention. For example, windmill generators have been considered for incorporation into the FIG. 1 schematic in the place of the photovoltaic/inverter arrangement.

Output 64 is coupled to the input of an inverter 66. As is known in the field, an inverter converts DC electricity into AC electricity. This is necessary here because the hydrogen liberator consumes AC, but the photovoltaic panel 62 produces DC. The conversion of the DC input results in an AC power output 68.

This output 68 is coupled to a first input 70 of a photo switch 72. A second input 74 of switch 72 is electrically coupled to the AC bus 30 via an electrical conduit 76. The second input arrangement enables hydrogen liberator 54 to run on AC generated by turbine 10 or derived from the AC utility 28 in the event that power is not available from the photovoltaic panel 62. An AC output 78 of switch 72 is used to deliver the AC power from any source to the hydrogen libertor 54.

The position of photo switch 72 is determined by the amount of output of the photovoltaic panel 62 (which will depend on the light available). So long as the output of the photovoltaic panel 62 remains above a predetermined level (e.g., on a sunny day), switch 72 will remain as shown in FIG. 1, that is, switch 72 will provide a short-circuit between output 68 of inverter 66 and the hydrogen libertor 54.

If, however, the output of photovoltaic panel 62 falls below the predetermined level (e.g., there is insufficient light available because of darkness or overcast skies), then switch 72 will move to input 74. This completes the circuit between the AC bus 30 via conduit 76 and enables hydrogen to be generated using AC power from the turbine 10 or AC utility 28.

FIG. 2 shows how the present invention might be physically embodied on a mobile plant 200 with associated components. The mobile power plant 200 is mounted on a mobile platform 208 trailer with wheels 212. The term "platform" will be used throughout this specification and in the claims. It should be noted that this term is not to be defined to specify any specific configuration (like that shown in FIG. 2), but instead should be interpreted to include anything which may serve as a base on which (or about which) system components may be located. The mobile platform in FIG. 2 has a hitch portion 214 which makes it towable behind a motorized vehicle.

Looking at FIG. 2 from right to left, we see that photovoltaic panels 62 are mounted on the ground. Inverters 66 are mounted onto the panel. It will be recognized that only one inverter is shown in FIG. 1. This is accurate conceptually, but not physically. In the FIG. 2 actual physical embodiment, there could be several inverters used. These inverters serve as means to convert the DC power received from the photovoltaic panel to AC so that it can be used to operate hydrogen liberator 54. Once the DC from the photovoltaic panel is converted into AC it is received in a line 64.

Immediately left of panel 62, hydrogen liberator 54 comprises two units. The first is an electrolysis unit 202. The second is a compressor unit 204. These receive AC power through supply line 68.

Immediately left of the hydrogen liberator units are the hydrogen tanks 46 topped by header 28. From header 28 hydrogen line 44 (which includes valve 60) is shown entering into a cabinet 240 on platform 208. Cabinet 240 houses fuel cell 40 which is fed with hydrogen by line 44.

At the forward-most portion of platform 208 is a cabinet 252. Cabinet 252 houses capacitors 52 and rectifiers 32. The necessary electrical connections into the cabinet are not shown, but one skilled in the art will recognize that such connections would be necessary and also know how to make them.

Immediately left of cabinet 252, another cabinet 210 is used to house the turbine. The turbine, natural gas input line, and electrical output line, all exist with respect to cabinet 210, but are not shown in the figure. One skilled in the art would know how these connections into and out of the cabinet could be accomplished.

Left of the turbine housing cabinet 210 is another storage cabinet 246. Storage cabinet 246 is used to house hydrogen tanks, either instead of the external tanks 46, or in addition to these tanks. If hydrogen tanks are included in cabinet 210, it will be necessary to have a hydrogen tubing coming from this cabinet into adjoining cabinet 240 which houses the fuel cell(s).

Immediately left of cabinet 240 is another cabinet 270 which includes a mini-power zone (not shown). Cabinet 270 receives lines 64 and 68. Line 64 receives inverted AC power which has been generated by the photovoltaics. Line 68 is used to deliver power from the power zone back to the hydrogen liberator units 54. Included in the cabinet are photosensitive switch 72, a panel board, and step-up or step-down transformer depending on the requirements of the system.

Immediately left of cabinet 270 is the housing for the transfer switch 22 which is used to make the transition from turbine to AC utility power. Again, the wiring into and out of this housing is not shown. But those skilled in the art will recognize that a wire from the turbine output into the switch would be required. Also required would be a connection into the AC utility power grid. There would also need to be wiring from this connecting the switch into a bus which also includes connections into the rectifier/capacitor cabinet 252.

In the figure, not all of the components are shown as being on the trailer/platform. It is in many cases preferred, however, that all the components be included on the trailer so that the entire system could be mobilized. Thus, it should also be considered an alternative embodiment of this invention that more or all of the components be actually included on the platform at least during transit. Once a location is reached, it is also possible that some of the components could be removed at that time from the trailer for use.

It is also possible that some components would already exist at the traveled-to location and, thus, would not have to be included on the trailer. For example, the hydrogen- storage tanks, natural-gas tanks, water supply (e.g., tap water hose) might already exist at the location and not need to be brought on the trailer.

It will be recognized that the natural-gas tanks as well as utility natural gas supply are not shown in FIG. 2. Though not shown, it should be understood that the tanks may or may not be included as transportable on the trailer. Alternatively, they could be maintained at the site and then installed with the rest of the system when the mobile trailer arrives on site. The utility supply will normally exist at the site.

Regardless of the specific arrangement, the mobility of the system gives it significant advantages over conventional ones. For example, the entire system could be moved into less populated areas to offer wireless phone service. To do so, the trailer could travel to any spot in which AC power and natural gas connectivity exists, quickly set up, and offer service very quickly. For example, use in remote areas in Wichita, Kans., one month as needed, then transported to Canton, Ohio, for use there the next month.

Because the system is preassembled and ready to go, there is no need for project engineers at either site to custom design a power system for the intended facility.

Before diving into the processes of the present invention, it should be understood that it is very important that power is not lost to the BTS—even temporarily. Failures could irrevocably damage customer relations. Customers are becoming increasingly dependent on telecommunications systems to handle important matters, e.g., financial transactions. The system and processes here dramatically reduce the possibilities for failure.

After the system as described above is installed, the steps in FIGS. 3 and 4 describe one embodiment for system operation.

The power-management flow chart of FIG. 3 shows different contingency plans in the event that the primary power source (powering turbine 10 using natural gas from a utility) and possibly secondary power sources are inoperable for one reason or another.

In a first step 302, it is determined whether natural gas is available from natural gas utility 12. The existence of utility natural gas is continuously monitored by sensors or other means known to those skilled in the art. One example which could be used here is that of a pressure sensor located down stream of the expansion tank (not shown) in line 14. The presence of utility provided natural gas would be indicated by meeting a threshold pressure. An absence of utility natural gas would show up as a drop in pressure below this threshold.

If the existence of utility provided natural gas is indicated, turbine 10 will be used to generate electricity from commercially available source 12 in a step 304. Switch 22 will be in its first position 24 as shown. This position causes the AC generated to be converted to DC by one or more rectifiers (e.g., plurality of rectifiers 32) in a step 306. The DC output from the rectifiers is received by bus 34.

When this occurs, the process splits. The DC power generated is both used for consumption by the BTS in a step 308, but it is also used to charge, and/or maintain a charge in the capacitors 52 in a step 310. These charged capacitors will be used for bridging purposes as will be discussed in more detail hereinafter.

Moving now back to the top of FIG. 3, if, in step 302, sensing equipment indicates that natural gas is not available from utility 28, the process moves on to a query of whether a stored source of natural gas (e.g., in natural gas tanks 16) is available in a step 312. If this is so, automated valves 17 will be activated to release pressurized natural gas from the tanks to maintain the fueling of turbine 10 and maintain the generation of AC power by turbine 10 in step 304. While the natural gas source is switched, transfer switch 22 remains in first position 24 enabling the AC output 18 of turbine 10 to continue to travel through bus 30 to the rectifiers 32. Rectifiers 32 then convert the AC into DC in step 306 and then in step 310 provide DC power to BTS 36 via bus 34.

The other possibility in step 312 is that either immediately or some time after automated valves 17 have been opened and the stored source of natural gas has run out, pressures in line 14 drop below the threshold indicating the complete absence of natural gas as an energy source. The pressure-sensing devices in line 14 will indicate to the automated control system that the pressures have fallen below the threshold and that natural gas is unavailable.

If natural gas is unavailable from either of sources 12 or 16, then the control system will cause switch 22 to go to its second position 26 in a step 314. Second position 26 allows the system to access AC power from commercial utility 28. This AC power is then, via bus 30, converted into DC by rectifiers 32 and then made available to the BTS 36 through bus 34.

Next, in a step 316, a determination is made as to whether AC power is, or is not available from local utility 28. This determination will be made by electronically monitoring bus 30 for power after the switch is made. If no AC is available from utility 28 because, e.g., (i) the power grid is down, or (ii) switch 22 malfunctions and cannot make the switch, no current will be detected in bus 30 and the control system will cause the process to move on to a step 318.

In step 318, a query is made as to whether pressurized hydrogen is available from tanks 46. This is automatically determined by the control system using pressure sensors in a manner known to those skilled in the art.

If hydrogen is available, the process moves on to a step 320. In step 320, valves 50 will be automatically opened up and hydrogen will travel through tubing 44 to fuel cell 40. Fuel cell 40 then generates a DC power output. This output is introduced into bus 34 to supply BTS 36. Fuel cell 40 will continue to generate DC output in step 320 until (i) the hydrogen runs out, or (ii) one of the other sources (natural gas or utility AC) are restored. If any of natural gas sources 12 or 16, or utility AC 28 are restored, the control system will switch back to these sources.

But if these sources are not restored, and the hydrogen runs out, the process will move on to a step 322. In step 322, a determination will be made as to whether the capacitors have sufficient existing charge that they are able to bridge. If so, capacitors 52 will be used to temporarily maintain DC power in bus 34 in a step 324. This maintains power for the consumption by BTS 36 in step 308 so that power is not lost.

The most common scenarios for temporary power loss are when power is temporarily lost because of (i) switching between energy generation devices (e.g., turbine 10 and fuel cell 40) or (ii) because of start-up delays. For example, in the event of turbine failure there will be a short delay from the time turbine 10 ceases to function, switch 22 is activated by the control system to change positions (from 24 to 26), and AC is restored to BTS 36 by AC utility 28. And when the system goes to its next backup system—fuel cell 40, there will also be delays which cause a temporary gap in power generation. It takes several seconds to bring the fuel cell online. Most of this downtime is due to the delay in the hydrogen getting to the point at which it is adequately supplying fuel cell 40. All of these scenarios create a temporary time-gap in which there is no power being generated. When this occurs, the "no" answer to query steps 302, 312, 314, 316, and 318, and the "yes" answer in step 322 will lead us to bridging step 324 in which the capacitors temporarily bridge power so that failure is avoided.

While capacitors 52 are bridging in step 324, the process continuously loops back through steps 302, 312, 314, 316, and 318 as shown in FIG. 2. This will repeat the inquiries as to whether any of the alternative sources (natural gas, utility AC, hydrogen) have been restored. If so, the process will revert back to that source. If not, the capacitors will continue to bridge until one of the sources (natural gas, utility AC, or hydrogen) is restored or the capacitors are fully drained.

The present invention also includes a novel way of generating and maintaining pressurized hydrogen for use by fuel cell 40. FIG. 4 is a flow diagram showing these hydrogen-generating processes.

These processes begin with a step 402 in which a determination is made as to whether sufficient solar energy is available. This depends on whether there is currently enough sunlight for photovoltaic panel 62 to generate power. On a sunny day, the answer to the step 402 query will be yes. If it is nighttime, or on an overcast day, the answer will be no.

When sufficient sunlight is available, then the process moves on to a step 404. In step 404 the photovoltaic panels are used to generate DC. This DC is then converted to AC power using inverter 66 in a step 406. It is presumed that photosensitive switch 72 is already in position 70 as shown in FIG. 1. When this is true, the converted AC will be introduced into the hydrogen generator 54 for the purpose of generating hydrogen gas in a step 408.

Valves 50 are then opened. The hydrogen generated by the electrolysis unit 202 and then pressurized by the compressor unit 204 is then introduced into storage tanks in a step 410. Step 410 involves the fuel being transferred from hydrogen liberator 54 in line 56, and then into header 58 so that the pressure can be equalized in all the tanks. Thus, hydrogen pressure in tanks 46 will be generated using electricity generated by the photovoltaic panel 62 if sufficient sunlight exists.

If, however, in step 402, insufficient sunlight levels are available to make sufficient DC generation by the solar panel possible, the process proceeds to a step 412. In this step photocell control switch 72 moves from position 70 to alternative position 74. Immediately after the switch is made in step 412, a determination is made in a step 414 of whether AC power is available from AC bus 30. This AC will be available if either of turbine 10 or AC utility 28 is operational. The determination is made by electronically monitoring the bus to determine whether current is detected. One skilled in the art will know how this is done. If no current is available, the process will loop back to step 402 and then loop through steps 402, 412, and then 414 over and over until some source of AC (via solar panel 62 or AC bus 30) returns. If, however, in step 414 AC is available from bus 30, the AC power will be used to power the AC hydrogen liberator in step 408. When this occurs, AC power is drawn through conduit 76 from the AC bus 30 which is receiving current from one of turbine 10 or AC utility 28. Then hydrogen is introduced to the hydrogen tanks in a step 410.

Pressure sensors in the tanks 46 are used to determine whether a predetermined pressure has been reached in a step 416. This predetermined pressure is recognized by the control system. When the predetermined pressure has not been reached, the process will loop back to step 408 and hydrogen gas will continue to be generated. This loop in the process will continue until the predetermined pressure is met. This predetermined pressure, in the preferred embodiment, is a desired storage pressure for the hydrogen. This pressure will enable the hydrogen to be transported to be consumed in the fuel cell (when the fuel cell is in use).

Once the pressure in the tanks hits the predetermined value in step 416, the process will proceed to a step 418. In this step, the control system will cause the production of hydrogen to stop. The compressor is also stopped. Further, automated valves 50 are closed. It should be mentioned that the production of power by solar panel 62 will not typically be stopped even though the hydrogen liberator is not operating. This extra power generated will likely be used for some other purpose. For example, the AC can be delivered back to the utility as part of an energy-purchasing program. Alternatively, this power could be introduced into the FIG. 1 system and used in some other way (e.g., introduced into AC bus 30 to lighten the load on the turbine or AC utility).

The hydrogen liberator will remain off until the pressure detected in the tanks has fallen below the predetermined pressure. If it does, the pressure drop will be detected in a step 420. If in step 420, the pressure has not dropped below the predetermined value, the process will simply loop back to step 418 and the hydrogen liberator will remain off. If, however, the pressure has dropped below the predetermined value due to, e.g., fuel cell 40 having been activated and consuming hydrogen, this consumption will immediately cause the pressure in line 44 and header 58 to drop. This drop will trigger a return to step 402 in the process. This will again cause activation of the hydrogen liberator powered by the photovoltaic panel, or by the turbine or AC utility via AC bus 30. Thus, the predetermined pressure for the hydrogen in the tanks is met and then restored if necessary.

Though the processes disclosed above all include some kind of hierarchy in which the backup options are all in the alternative, it is also possible that these options could be used in combination. For example, the DC power backup hierarchy is disclosed as being turbine 10, then AC utility 28, then fuel cell 40, with none of these separate AC sources being operated at the same time. It is important to note, that the simultaneous operation of different components are to be considered as falling within the scope of the present invention. For example, if only a portion of the power desired is able to be provided by the turbine, the remaining portion could be simultaneously received from the AC utility or produced by the fuel cell to make up the difference. This might be particularly advantageous on a particularly sunny day when unusually ample hydrogen can be developed with little cost. This might cause the user to supplement the primary source of power generated by turbine 10 to save natural gas.

The same is true with respect to the two options for providing AC power to hydrogen liberator 54. If the photovoltaic panel 62 is only able to generate a portion of the AC required to power hydrogen liberator 54, the remaining portion could be drawn from the AC bus 30. This means that hydrogen liberator 54 would be powered by two different sources simultaneously.

Other operational alternatives might exist depending on changes in operational costs. For example, if the price of natural gas rises above the cost of AC power from the power grid, the operator would likely want to change the hierarchy such that the standard position of switch 22 is position 26, and that position 24 is the backup position. This would cause power to be drawn from AC utility 28 first before the turbine is used to combust natural gas. The turbine would be used as backup, rather than the primary source of power.

Another possibility is for the control system to monitor the amount of AC power or natural gas which has been consumed to date, e.g., for that month. Some utility arrangements result in rate increases when consumption exceeds certain levels. The control system can monitor the time when these levels have been reached, and then switch to an alternative energy source if its operational costs make it more financially attractive.

It will be appreciated by people skilled in the art that the present invention is not limited to what has been particularly shown and described above. Rather, all matter shown in the accompanying drawings or described above is to be interpreted as illustrative and not limiting. Accordingly, the scope of the present invention is defined by the appended claims rather than the foregoing description.

What is claimed is:

1. A power supply system comprising:
    a turbine for generating a first source of alternating current (AC), said turbine adapted to combust natural gas;
    a conversion device for converting said first source of AC into a first source of direct current (DC);
    a hydrogen liberator for producing hydrogen; and
    a device adapted to consume said hydrogen produced to generate a second source of DC.

2. A power supply system comprising:
    a first source of alternating current (AC);
    a conversion device for converting said first source of AC into a first source of direct current (DC);
    a hydrogen liberator for producing hydrogen; and
    a device adapted to consume said hydrogen produced to generate a second source of DC; and
    a control system which is operable to switch between one of a turbine and an electrical utility to obtain said first source of AC.

3. A power supply system comprising:
    a first source of alternating current (AC);
    a conversion device for converting said first source of AC into a first source of direct current (DC);
    a hydrogen liberator for producing hydrogen; and
    a fuel cell adapted to consume said hydrogen produced to generate a second source of DC.

4. The system of claim 3 wherein said fuel cell comprises at least one proton exchange membrane.

5. A power supply system comprising:
    a first source of alternating current (AC);
    a conversion device for converting said first source of AC into a first source of direct current (DC);
    a hydrogen liberator for producing hydrogen;
    a fuel cell adapted to consume said hydrogen produced to generate a second source of DC; and
    said hydrogen libertor is powered using a solar energy source.

6. The system of claim 5 comprising:
    a switch enabling said hydrogen liberator to be optionally powered by one of said first source of AC and a solar energy source.

7. The system of claim 6 wherein said switch is adapted to be activated depending on an amount of solar energy available.

8. The system of claim 6 including at least one capacitor to bridge when switching between said first and second sources of DC.

9. A mobile power system comprising:
    a mobile platform;
    a turbine on said platform for generating electricity; and
    a fuel cell on said platform for generating electricity.

10. A mobile power system comprising:
a mobile platform;
a turbine on said platform for generating electricity;
a hydrogen-consuming device on said platform for generating electricity; and
an additional device, said additional device comprising one of:
(i) a solar panel, (ii) a hydrogen-generating device, (iii) an AC to DC conversion device, (iv) a capacitor, and (v) fuel tanks;
said additional device being on or about said mobile platform.

* * * * *